US012665990B2

(12) United States Patent
Wang et al.

(10) Patent No.: US 12,665,990 B2
(45) Date of Patent: Jun. 23, 2026

(54) LIGHT ENGINE AND PROJECTION DEVICE

(71) Applicant: Formovie (Chongqing) Innovative Tech. Co., Ltd., Chongqing (CN)

(72) Inventors: Yuyao Wang, Chongqing (CN); Lele Song, Chongqing (CN); Hao Jiang, Chongqing (CN); Dazhi Tan, Chongqing (CN)

(73) Assignee: Formovie (Chongqing) Innovative Tech. Co., Ltd., Chongqing (CN)

( * ) Notice: Subject to any disclaimer, the term of this patent is extended or adjusted under 35 U.S.C. 154(b) by 289 days.

(21) Appl. No.: 18/223,655

(22) Filed: Jul. 19, 2023

(65) Prior Publication Data

US 2024/0031537 A1     Jan. 25, 2024

(30) Foreign Application Priority Data

Jul. 20, 2022     (CN) .......................... 202210853132.3

(51) Int. Cl.
H04N 9/31          (2006.01)
(52) U.S. Cl.
CPC ......... H04N 9/3144 (2013.01); H04N 9/3152 (2013.01); H04N 9/317 (2013.01); H04N 9/3197 (2013.01)
(58) Field of Classification Search
CPC .... H04N 9/3144; H04N 9/3152; H04N 9/317; H04N 9/3197
USPC ........................................................ 353/52
See application file for complete search history.

(56) References Cited

U.S. PATENT DOCUMENTS

2004/0041984 A1 *     3/2004     Tani ...................... G03B 27/54
                                                                353/20

FOREIGN PATENT DOCUMENTS

| | | | | |
|---|---|---|---|---|
| CN | 209657071 U | * | 11/2019 | |
| CN | 113156754 A | * | 7/2021 | ........... G03B 21/145 |
| CN | 216561377 U | | 5/2022 | |
| CN | 114594647 A | | 6/2022 | |
| CN | 114721210 A | | 7/2022 | |
| JP | 2001042435 A | | 2/2001 | |

OTHER PUBLICATIONS

Translation of CN_113156754_A (Year: 2025).*
Translation of CN_209657071_U (Year: 2025).*

* cited by examiner

*Primary Examiner* — Jerry L Brooks
(74) *Attorney, Agent, or Firm* — Ballard Spahr LLP

(57)          ABSTRACT

A light engine includes a housing, an optical assembly, a heat exchange device, and a fan. A first lens, a second lens, and the housing cooperatively define a first closed chamber. The first closed chamber includes an air-cooling chamber, a first heat exchange chamber, and a second heat exchange chamber. The first heat exchange chamber and the second heat exchange chamber are arranged on opposite sides of the light converging member, respectively. The air-cooling chamber is in communication with the first heat exchange chamber and the second heat exchange chamber. The liquid crystal light valve is arranged in the air-cooling chamber. A part of the heat exchange device is located in the first heat exchange chamber and/or the second heat exchange chamber. The air blower is provided in the first heat exchange chamber or the second heat exchange chamber.

18 Claims, 8 Drawing Sheets

32(31)

33

32(31)

34

LIGHT ENGINE AND PROJECTION DEVICE

CROSS-REFERENCE TO RELATED APPLICATIONS

This application claims priority to Chinese Patent Application No. 2022108531323, filed on Jul. 20, 2022, the contents of which is hereby incorporated by reference in its entirety.

TECHNICAL FIELD

The present disclosure relates to the field of projection technology, in particular to a light engine and a projection device.

BACKGROUND

The light engine is composed of a light source, a light converging member, a front Fresnel lens, a liquid crystal light valve, a rear Fresnel lens, a projection lens, etc. When projecting, the light source emits light, which passes through the rear Fresnel lens to the liquid crystal light valve, and then the emitted light is collected to the projection lens through the front Fresnel lens, and finally content displayed by the liquid crystal light valve is projected onto the screen.

Due to the low transmittance of the liquid crystal light valve, most of the light converged on the liquid crystal light valve is absorbed and transformed into the form of heat, resulting in a very high temperature of the liquid crystal light valve. In order to solve the heat dissipation problem, a heat exchange device is arranged in the light engine, however, the heat dissipation efficiency of a common light engine is low and the volume of the light engine is large.

SUMMARY

According to some embodiments of the present disclosure, a light engine and a projection device are provided.

The light engine includes a housing, an optical assembly, a heat exchange device, and an air blower. The optical assembly includes a light source and a light converging member, a first lens, a liquid crystal light valve, and a second lens arranged in sequence along a propagation path of light emitted from the light source. The first lens, the second lens, and the housing cooperatively define a first closed chamber. The first closed chamber includes an air-cooling chamber, a first heat exchange chamber, and a second heat exchange chamber. The first heat exchange chamber and the second heat exchange chamber are arranged on opposite sides of the light converging member, respectively. The air-cooling chamber is arranged between the first heat exchange chamber and the second heat exchange chamber and is in communication with the first heat exchange chamber and the second heat exchange chamber, respectively. The liquid crystal light valve is arranged in the air-cooling chamber. The heat exchange device is provided on a wall of the first heat exchange chamber and/or a wall of the second heat exchange chamber, and a part of the heat exchange device is located in the first heat exchange chamber and/or the second heat exchange chamber. The air blower is provided in the first heat exchange chamber or the second heat exchange chamber. The air blower is configured to circulate cooling airflow in the first heat exchange chamber, the air-cooling chamber, and the second heat exchange chamber and enable the cooling airflow to flow through the liquid crystal light valve and the heat exchange device.

The projection device includes the aforementioned light engine.

Details of one or more embodiments of the present disclosure are set forth in the following drawings and descriptions. Other objects, purposes and advantages will become apparent upon review of the following specification, drawings and claims.

BRIEF DESCRIPTION OF THE DRAWINGS

The accompanying drawings of the present disclosure are used to provide further understanding of the present disclosure, and the embodiments of the present disclosure and descriptions are used to explain the present disclosure, but not to limit the present disclosure.

In order to illustrate the embodiments of the present disclosure more clearly, the drawings used in the embodiments will be described briefly. Apparently, the following described drawings are merely for the embodiments of the present disclosure, and other drawings can be derived by those of ordinary skill in the art without any creative effort.

Figure 1:
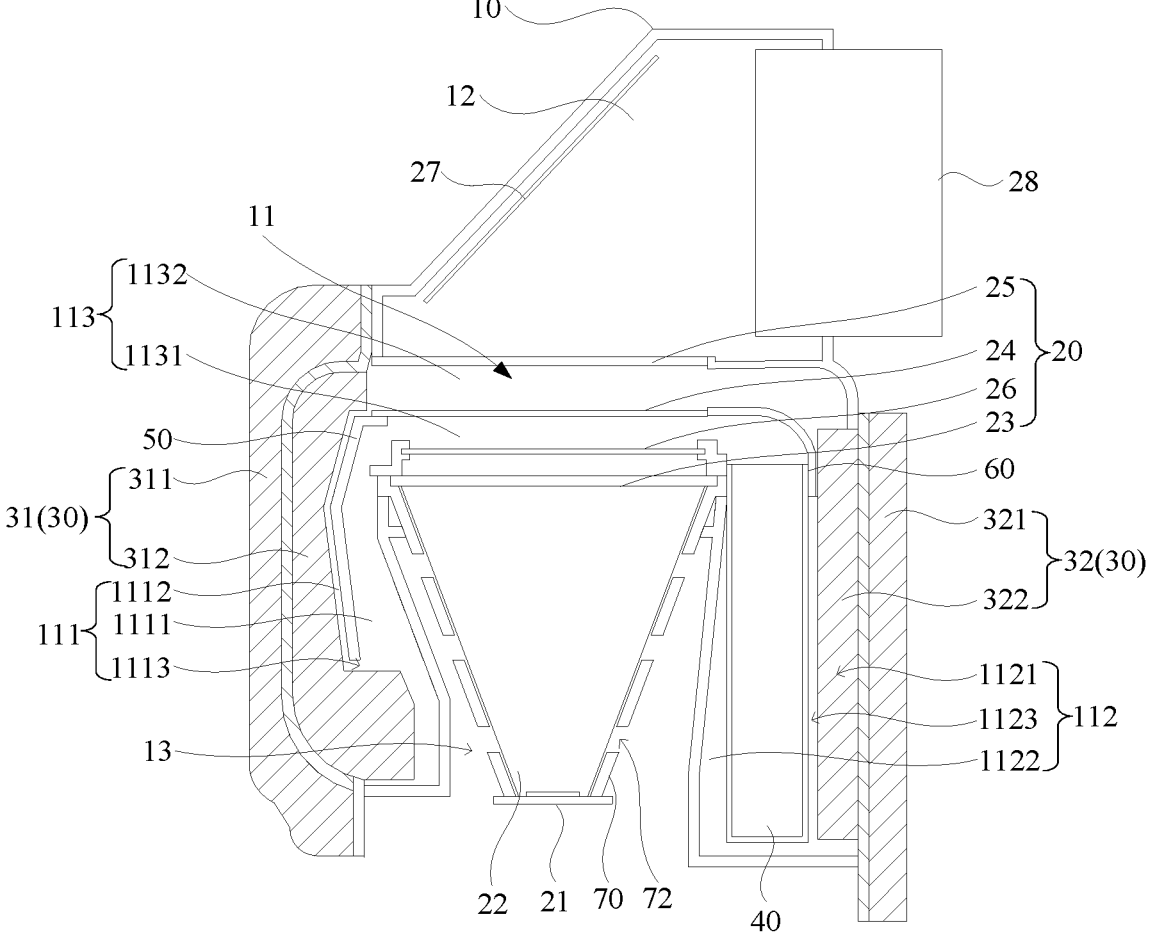
FIG. 1 is a cross-sectional view of a light engine according to a first embodiment of the present disclosure.

Description of reference numerals: 10, housing; 11, first closed chamber; 111, first heat exchange chamber; 1111, third air channel; 1112, fourth air channel; 1113, first gap; 112, second heat exchange chamber; 1121, fifth air channel; 1122, sixth air channel; 1123, second gap; 113, air-cooling chamber; 1131, first air channel; 1132, second air channel; 1133, first air sub-channel; 1134, second air sub-channel; 12, second closed chamber; 13, mounting groove; 20, optical assembly; 21, light source; 22, light converging member; 23, first lens; 24, liquid crystal light valve; 25, second lens; 26, heat insulating optical plate; 27, reflector; 28, projection lens; 30, heat exchange device; 31, first heat exchanger; 311, first heat dissipation portion; 312, first heat exchange portion; 32, second heat exchanger; 321, second heat dissipation portion; 322, second heat exchange portion; 33, heat dissipation structure; 34, heat dissipation fin; 40, air blower; 50, first separating member; 60, second separating member; 70, bracket; 71, receiving cavity; 72, heat dissipating hole.

DETAILED DESCRIPTION OF THE EMBODIMENTS

In order to make the above objects, features and advantages of the present disclosure clear and easier to understand, the specific embodiments of the present disclosure are described in detail below in combination with the accompanying drawings. Many specific details are set forth in the following description to facilitate a full understanding of the present disclosure. However, the present disclosure can be implemented in many ways different from those described herein, and those skilled in the art can make similar improvements without departing from the connotation of the present disclosure. Therefore, the present disclosure is not limited by the specific embodiments disclosed below.

In the description of the present disclosure, it should be understood that the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential direction" are based on the azimuth or position relationship shown in the attached drawings, which are only for the convenience of describing the present disclosure and simplifying the description, rather than indicating or implying that the device or element must have a specific azimuth, be constructed and operated in a specific azimuth, so such terms cannot be understood as a limitation of the present disclosure.

In addition, the terms "first" and "second" are only used for descriptive purposes and cannot be understood as indicating or implying relative importance or implicitly indicating the number of indicated technical features. Thus, the features defined with "first" and "second" may explicitly or implicitly include at least one of the features. In the description of the present disclosure, "multiple" means at least two, such as two, three, etc., unless otherwise expressly and specifically defined.

In the present disclosure, unless otherwise expressly specified and limited, the terms "mount", "connect", "contact", "fix" and other terms should be understood in a broad sense, for example, they can be fixed connections, removable connections, or integrated. They can be mechanical connection or electrical connection. They can be directly connected or indirectly connected through an intermediate medium. They can be the connection within two elements or the interaction relationship between two elements, unless otherwise expressly limited. For those skilled in the art, the specific meaning of the above terms in the present disclosure can be understood according to the specific situation.

In the present disclosure, unless otherwise expressly specified and limited, the first feature "above" or "below" the second feature may be in direct contact with the first and second features, or the first and second features may be in indirect contact through an intermediate medium. Moreover, the first feature is "above" the second feature, but the first feature is directly above or diagonally above the second feature, or it only means that the horizontal height of the first feature is higher than the second feature. The first feature is "below" of the second feature, which can mean that the first feature is directly below or obliquely below the second feature, or simply that the horizontal height of the first feature is less than that of the second feature.

It should be noted that when an element is called "fixed to" or "provided on" another element, it can be directly on another element or there can be a centered element. When an element is considered to be "connected" to another element, it can be directly connected to another element or there may be intermediate elements at the same time. The terms "vertical", "horizontal", "up", "down", "left", "right" and similar expressions used herein are for the purpose of illustration only and do not represent the only embodiment.

Figure 2:
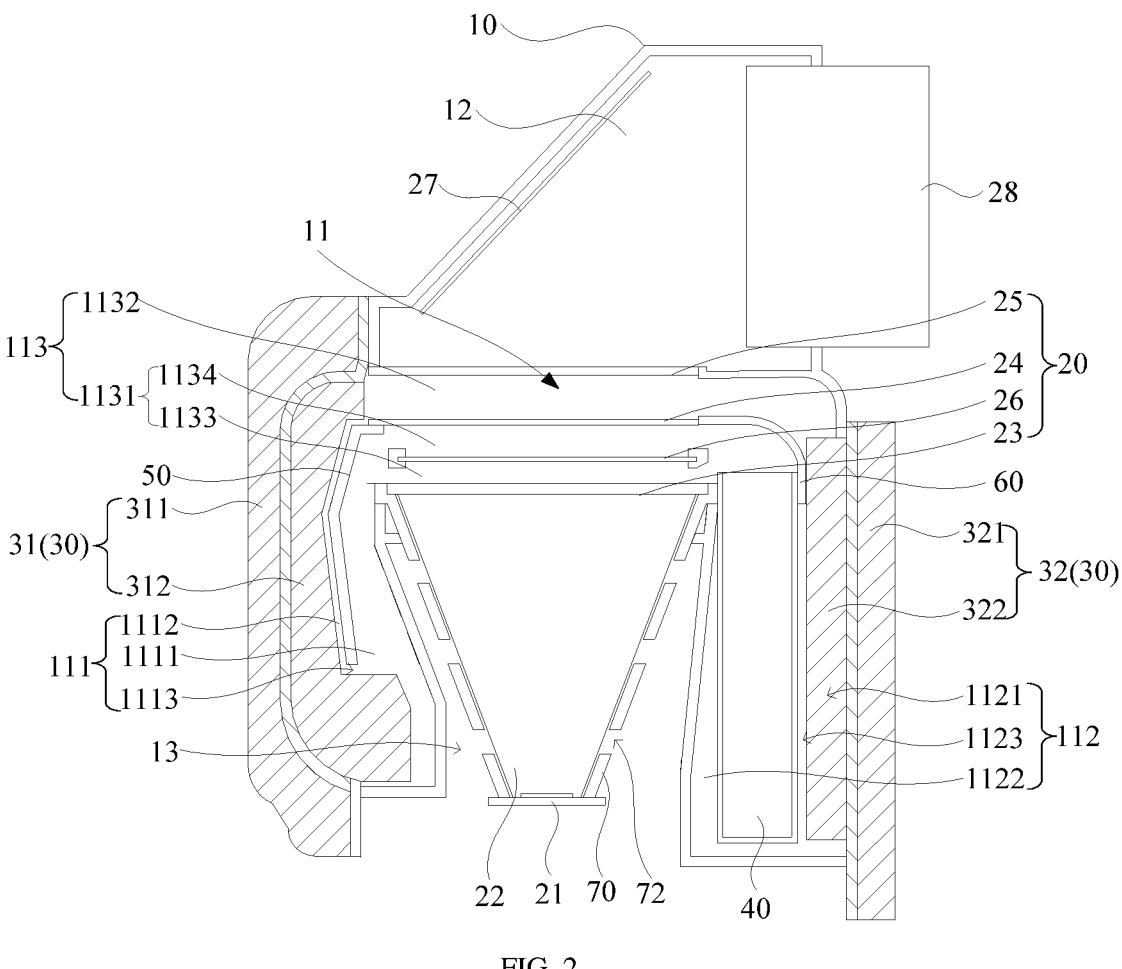
FIG. 2 is a cross-sectional view of a light engine according to a second embodiment of the present disclosure.
Figure 5:
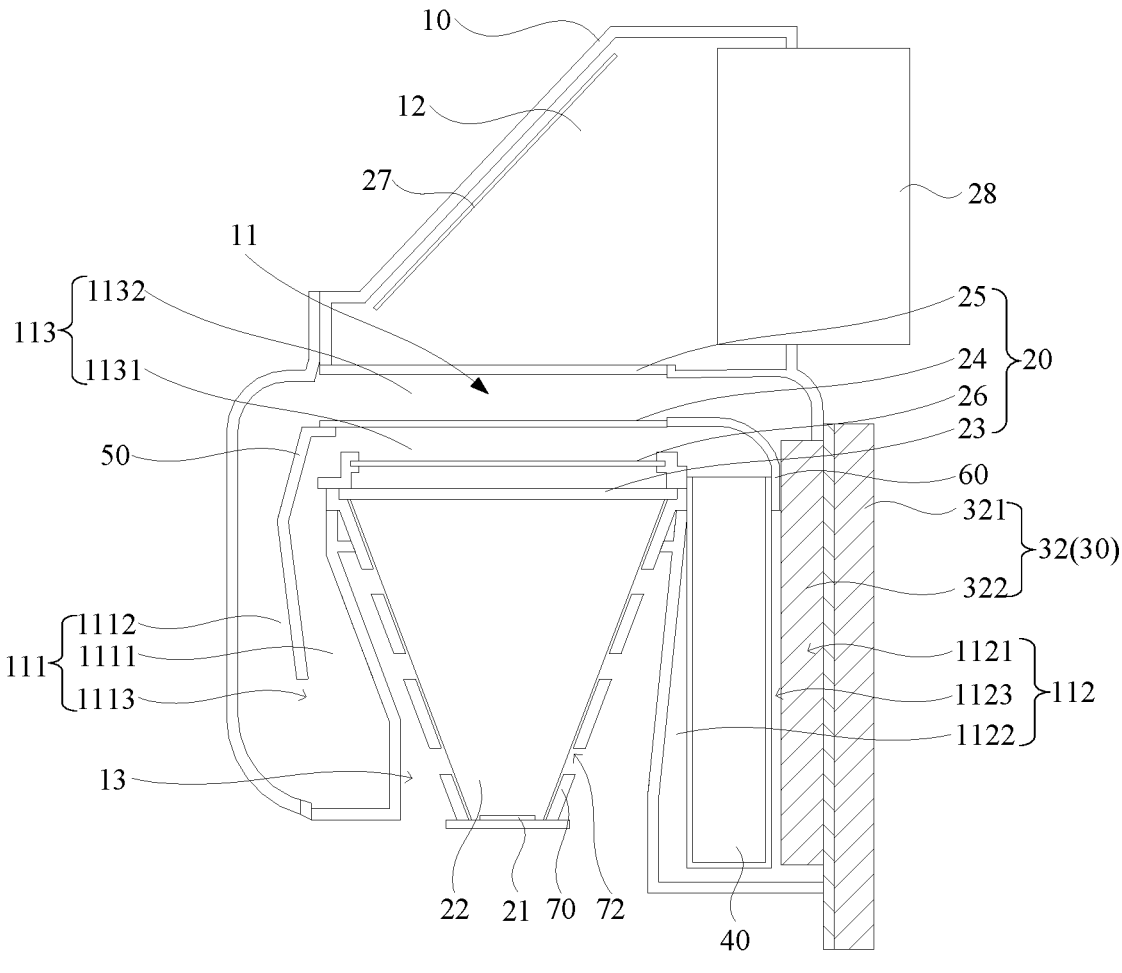
FIG. 5 is a cross-sectional view of a light engine according to a fifth embodiment of the present disclosure.

Referring to FIG. 1, FIG. 2 and FIG. 5, a light engine is provided according to an embodiment of the present disclosure, which includes a housing 10, an optical assembly 20, a heat exchange device 30, and an air blower 40. The optical assembly 20 includes a light source 21 and a light converging member 22, a first lens 23, a liquid crystal light valve 24, and a second lens 25 arranged in sequence along a propagation path of light emitted from the light source 21. The first lens 23, the second lens 25, and the housing 10 cooperatively define a first closed chamber 11. The first closed chamber 11 includes an air-cooling chamber 113, a first heat exchange chamber 111, and a second heat exchange chamber 112. The first heat exchange chamber 111 and the second heat exchange chamber 112 are arranged on opposite sides of the light converging member 22, respectively. The air-cooling chamber 113 is arranged between the first heat exchange chamber 111 and the second heat exchange chamber 112 and is in communication with the first heat exchange chamber 111 and the second heat exchange chamber 112, respectively. The liquid crystal light valve 24 is arranged in the air-cooling chamber 113. The heat exchange device 30 is provided on a wall of the first heat exchange chamber 111 and/or a wall of the second heat exchange chamber 112, and a part of the heat exchange device 30 is located in the first heat exchange chamber 111 and/or the second heat exchange chamber 112. The air blower 40 is provided in the first heat exchange chamber 111 or the second heat exchange chamber 112, and the air blower 40 is configured to circulate cooling airflow in the first heat exchange chamber 111, the air-cooling chamber 113, and the second heat exchange chamber 112 and enable the cooling airflow to flow through the liquid crystal light valve 24 and the heat exchange device 30.

According to the above-mentioned light engine, when projecting, the light emitted from the light source 21 is converged by the light converging member 22 and then passes through the first lens 23, the liquid crystal light valve 24, and the second lens 25 in sequence, and finally the content displayed by the liquid crystal light valve is projected onto a screen. During the projecting process, when the light that does not pass through the liquid crystal light valve 24 is converted into heat, the air blower 40 works to circulate the cooling airflow in the first heat exchange chamber 111, the air-cooling chamber 113, and the second heat exchange chamber 112. When the cooling airflow flows through the liquid crystal light valve 24, the heat of the liquid crystal light valve 24 can be dissipated. Then, the cooling airflow flows through the heat exchange device 30 located in the first heat exchange chamber 111 and/or the second heat exchange chamber 112, and the heat exchange device 30 absorbs the heat of the cooling airflow and transfers the heat outside the first heat exchange chamber 111 and the second heat exchange chamber 112 for cooling. After the heat exchange, the cooling airflow flows through the liquid crystal light valve 24 under the action of the air blower 40, so that the liquid crystal light valve 24 can be cooled and work at a required temperature, and the liquid crystal light valve 24 is prevented from being damaged duo to high temperature, which can prolong the service life of the light engine.

Since the first closed chamber 11 includes the first heat exchange chamber 111, the air-cooling chamber 113, and the second heat exchange chamber 112, the air-cooling chamber 113 is arranged between the first heat exchange chamber 111 and the second heat exchange chamber between the chambers 112, and is in communication with the first heat exchange chamber 111 and the second heat exchange chamber 112, respectively, the heat exchange device 30 is arranged on the inner wall of the first heat exchange chamber 111 and/or the inner wall of the second heat exchange chamber 112, and a part of the heat exchange device 30 is located in the first heat exchange chamber 111 and/or the second heat exchange chamber 112, a heat dissipation area can be increased and heat dissipation efficiency can be improved. In addition, the first heat exchange chamber 111 and the second heat exchange chamber 112 are arranged on opposite sides of the light converging member 22, respectively, that is, the light converging member 22 is arranged in a space defined by the first heat exchange chamber 111, the air-cooling chamber 113, and the second heat exchange chamber 112, so that space can be fully utilized and the volume of the light engine can be reduced.

In an embodiment, referring to FIG. 1, a first air channel 1131 is formed between the first lens 23 and the liquid crystal light valve 24, and a second air channel 1132 is formed between the liquid crystal light valve 24 and the second lens 25. One end of the first air channel 1131 is in communication with one end of the second air channel 1132 through the first heat exchange chamber 111, and the other end of the second air channel 1132 is in communication with the other end of the first air channel 1131 through the second heat exchange chamber 112. The air blower 40 is located in the second heat exchange chamber 112. The air blower 40 has an air inlet and an air outlet. The air outlet is in communication with the first air channel 1131, and the air inlet is in communication with the second air channel 1132. During the projecting process, when the light that does not pass through the liquid crystal light valve 24 is converted into heat, the air blower 40 works to enable the cooling airflow in the first closed chamber 11 to flow through the first air channel 1131 to dissipate the heat from a side of the liquid crystal light valve 24 facing the first lens 23, and then the cooling airflow flows through the first heat exchange chamber 111. If a part of the heat exchange device 30 is provided in the first heat exchange chamber 111, the heat exchange device 30 located in the first heat exchange chamber 111 can absorb the heat of the cooling airflow and transfers the heat to the outside of the first heat exchange chamber 111 for cooling, and the heat dissipation air after heat exchange flows through the second air channel 1132. If the heat exchange device 30 is not provided in the first heat exchange chamber 111, the cooling airflow flows directly into the second air channel 1132 through the first heat exchange chamber 111. The cooling airflow flowing through the second air channel 1132 dissipates the heat from a side of the liquid crystal light valve 24 facing the second lens 25, and then the cooling airflow flows into the second heat exchange chamber 112. If a part of the heat exchange device 30 is provided in the second heat exchange chamber 112, the heat exchange device 30 located in the second heat exchange chamber 112 absorbs the heat of the cooling airflow and transfers the heat outside the second heat exchange chamber 112 for cooling, and the heat dissipation air after heat exchange flows into the air inlet of the air blower 40. If the heat exchange device 30 is not provided in the second heat exchange chamber 112, the cooling airflow flows directly into the air inlet of the air blower 40 through the second heat exchange chamber 112.

In one embodiment, referring to FIG. 1, parts of the heat exchange device 30 are provided in both the first heat exchange chamber 111 and the second heat exchange chamber 112, respectively. The cooling airflow from the air outlet of the air blower 40 flows through the first air channel 1131 to dissipate the heat from the side of the liquid crystal light valve 24 facing the first lens 23, and then the cooling airflow flows into the first heat exchange chamber 111. The heat exchange device 30 located in the first heat exchange chamber 111 absorbs the heat of the cooling airflow and transfers the heat outside the first heat exchange chamber 111, and the heat dissipation air after heat exchange flows through the second air channel 1132. The cooling airflow flowing through the second air channel 1132 dissipates the heat from a side of the liquid crystal light valve 24 facing the second lens 25, and then the cooling airflow flows into the second heat exchange chamber 112. The heat exchange device 30 located in the second heat exchange chamber 112 absorbs the heat of the cooling airflow and transfers the heat outside the second heat exchange chamber 112, and then flows into the air inlet of air blower 40. In this way, before entering the first air channel 1131 and the second air channel 1132, the cooling airflow has already exchanged heat with the heat exchange device 30 in the first heat exchange chamber 111 and the second heat exchange chamber 112. When the cooling airflow flows through the first air channel 1131 and the second air channel 113, respectively, more heat from the liquid crystal light valve 24 can be dissipated, which is beneficial to improve heat dissipation efficiency.

In this embodiment, the air blower 40 is a vortex fan having two air inlets and one air outlet. The two air inlets are arranged opposite to each other, one of which is opposite to a side of the second heat exchange chamber 112 adjacent to the light converging member 22, and the other air inlet is opposite to a side of the second heat exchange chamber 112 away from the light converging member 22. The air outlet is opposite to the first air channel 1131.

Figure 3:
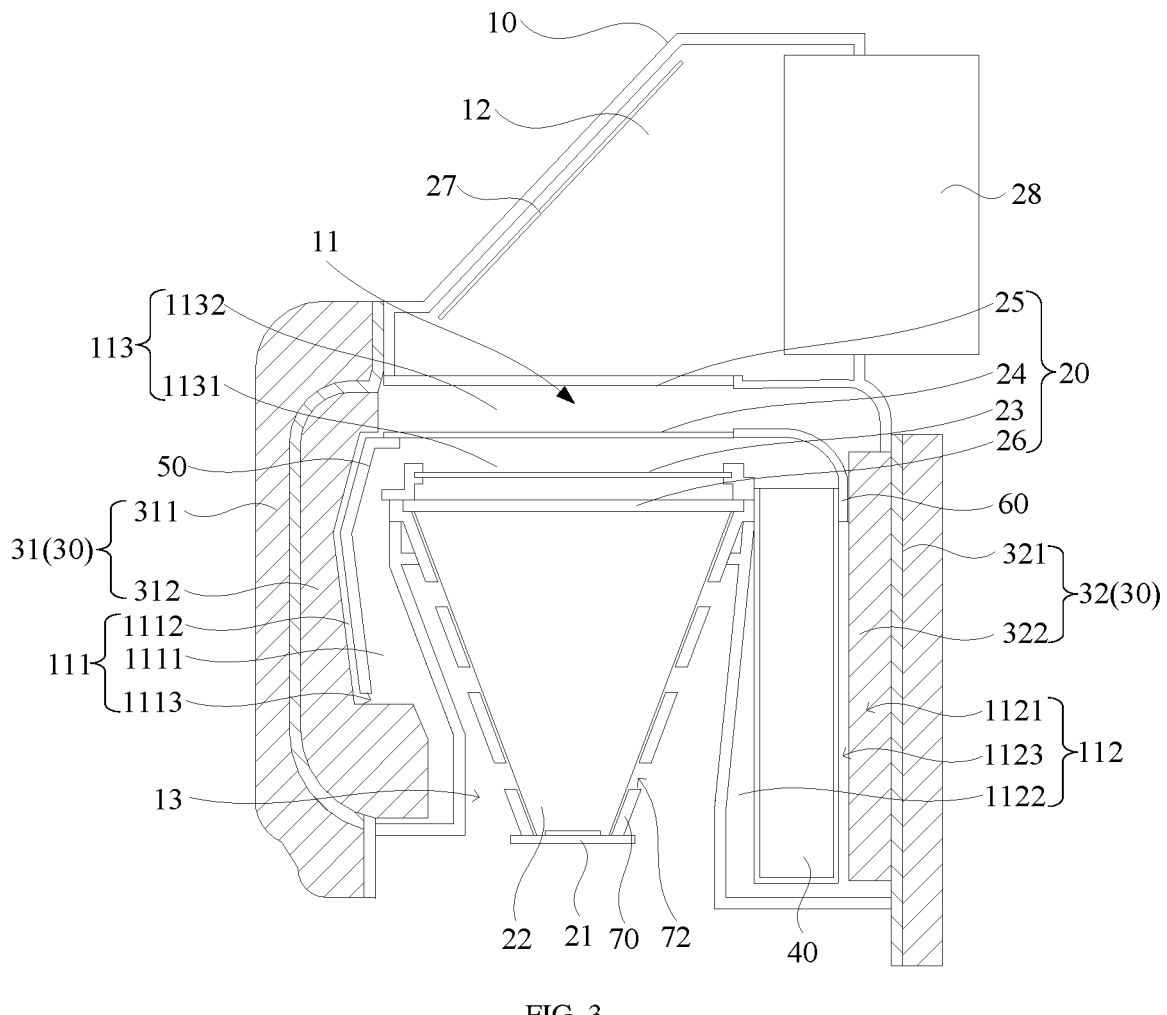
FIG. 3 is a cross-sectional view of a light engine according to a third embodiment of the present disclosure.

Further, referring to FIG. 1 and FIG. 3, the optical assembly 20 further includes a heat insulating optical plate 26 provided in the air-cooling chamber 113. The heat insulating optical plate 26 is arranged between the first lens 23 and the liquid crystal light valve 24. Alternatively, the heat insulating optical plate 26 is arranged on a side of the first lens 23 away from the liquid crystal light valve 24. In one embodiment, the heat insulating optical plate 26 is heat-insulating glass, and the heat-insulating glass is heat-reflective or heat-absorbable. During the projecting process, the heat insulating optical plate 26 is configured to effectively prevent the heat generated by the light source 21 from being transferred to the liquid crystal light valve 24, so as to prevent the heat from affecting other devices in the optical assembly 20. In addition, it is also beneficial to improve light utilization efficiency.

In one embodiment, referring to FIG. 1 and FIG. 3, during the projecting process, if the temperature of the first lens 23 is not high, both ends of the heat insulating optical plate 26 are sealingly connected to corresponding both ends of the first lens 23, respectively.

In one embodiment, referring to FIG. 2, during the projecting process, if the temperature of the first lens 23 is too high, the heat insulating optical plate 26 can be arranged between the first lens 23 and the liquid crystal light valve 24. The first air channel 1131 is then divided into a first air sub-channel 1133 and a second air sub-channel 1134 that are parallel to each other. The first air sub-channel 1133 is located between the first lens 23 and the heat insulating optical plate 26, and the second air sub-channel 1134 is located between the heat insulating optical plate 26 and the liquid crystal light valve 24. In this way, the air blower 40 blows the cooling airflow into the first air sub-channel 1133 and the second air sub-channel 1134, respectively, so as to reduce the temperature of the first lens 23 and the heat insulating optical plate 26.

In an embodiment, referring to FIG. 1, the heat exchange device 30 includes a first heat exchanger 31. The first heat exchanger 31 includes a first heat dissipation portion 311 and a first heat exchange portion 312. The first heat exchange portion 312 is provided in the first heat exchange chamber 111, and the first heat dissipation portion 311 is provided outside the first heat exchange chamber 111. During the projecting process, when the light that does not pass through the liquid crystal light valve 24 is converted into heat, the air blower 40 works to enable the cooling airflow in the first closed chamber 11 to flow through the first air channel 1131 to dissipate the heat from a side of the liquid crystal light valve 24 facing the first lens 23, and then the cooling airflow flows through the first heat exchange chamber 111. The first heat exchange portion 312 absorbs the heat of the cooling airflow and transfers the heat to the first heat dissipation portion 311 for cooling. The cooling airflow after heat exchange flows through the second air channel 1132, the cooling airflow flowing through the second air channel 1132 dissipates the heat from the side of the liquid crystal light valve 24 facing the second lens 25, and then the cooling airflow flows into the second heat exchange chamber 112 and flows into the air inlet of the air blower 40.

Figure 4:
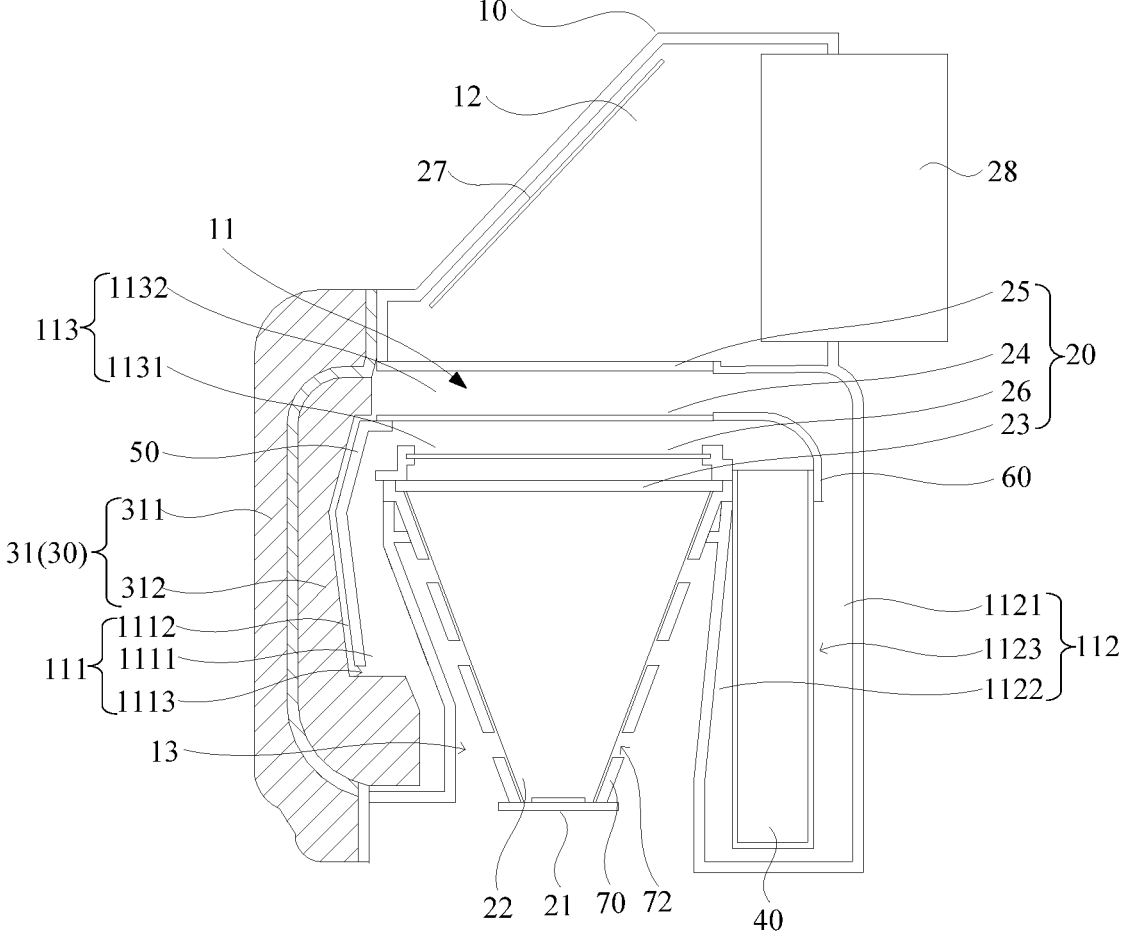
FIG. 4 is a cross-sectional view of a light engine according to a fourth embodiment of the present disclosure.

Further, referring to FIG. 1, FIG. 4 and FIG. 5, the light engine further includes a first separating member 50. One end of the first separating member 50 is sealingly connected to a side of the liquid crystal light valve 24 adjacent to the first heat exchange chamber 111, and the other end of the first separating member 50 extends into the first heat exchange chamber 111. A first gap 1113 is formed between the other end of the first separating member 50 and a wall of the first heat exchange chamber 111 away from the liquid crystal light valve 24, such that the first heat exchange chamber 111 is divided into a third air channel 1111 adjacent to the light converging member 22 and a fourth air channel 1112 away from the light converging member 22. One end of the third air channel 1111 is in communication with one end of the fourth air channel 1112 through the first gap 1113, the other end of the third air channel 1111 is in communication with the first air channel 1131, and the other end of the fourth air channel 1112 is in communication with the second air channel 1132. During the projecting process, when the light that does not pass through the liquid crystal light valve 24 is converted into heat, the air blower 40 works to enable the cooling airflow in the first closed chamber 11 to flow through the first air channel 1131 to dissipate the heat from the side of the liquid crystal light valve 24 facing the first lens 23, and then the cooling airflow flows through the third air channel 1111 and the fourth air channel 1112 in sequence. The first heat exchange portion 312 absorbs the heat of the cooling airflow and transfers the heat to the first heat dissipation portion 311 for cooling. The heat dissipating airflow after heat exchange flows through the second air channel 1132 to dissipate the heat from the side of the liquid crystal screen facing the second lens 25, then flows through the second heat exchange chamber 112, and then flows into the air inlet of the air blower 40. In this way, by providing the first separating member 50, the cooling airflow has a long path through the first heat exchanger 31, so as to improve heat dissipation efficiency.

Further, referring to FIG. 1, the first heat exchange portion 312 is arranged in the fourth air channel 1112, and the first heat exchange portion 312 extends from an end of the fourth air channel 1112 adjacent to the air-cooling chamber 113 to an end of the fourth air channel 1112 away from the air-cooling chamber 113. In this way, a space of the fourth air channel 1112 is fully utilized, an area of the first heat exchange portion 312 is increased, and the heat dissipation efficiency is improved.

Figure 7:
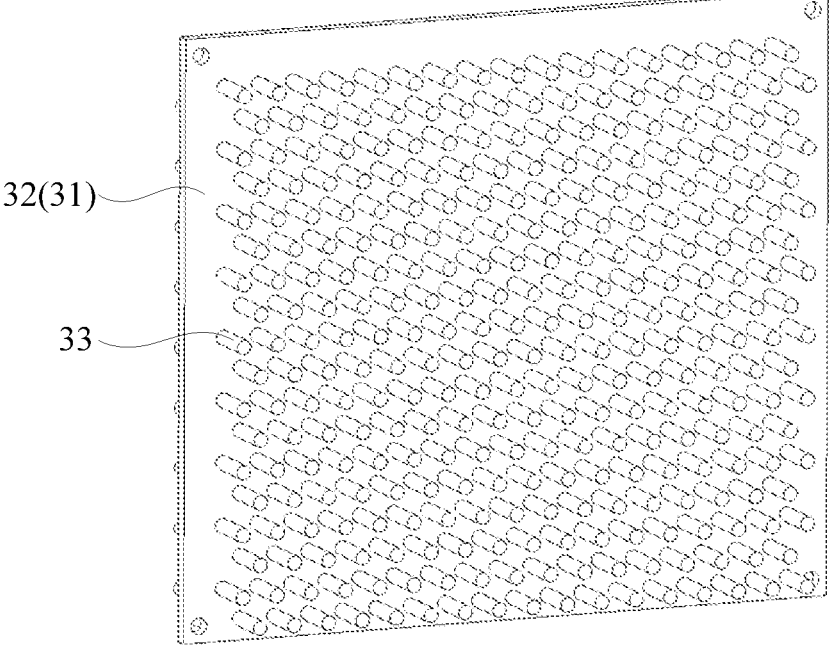
FIG. 7 is perspective view of a heat exchanger of a light engine according to an embodiment of the present disclosure.
Figure 8:
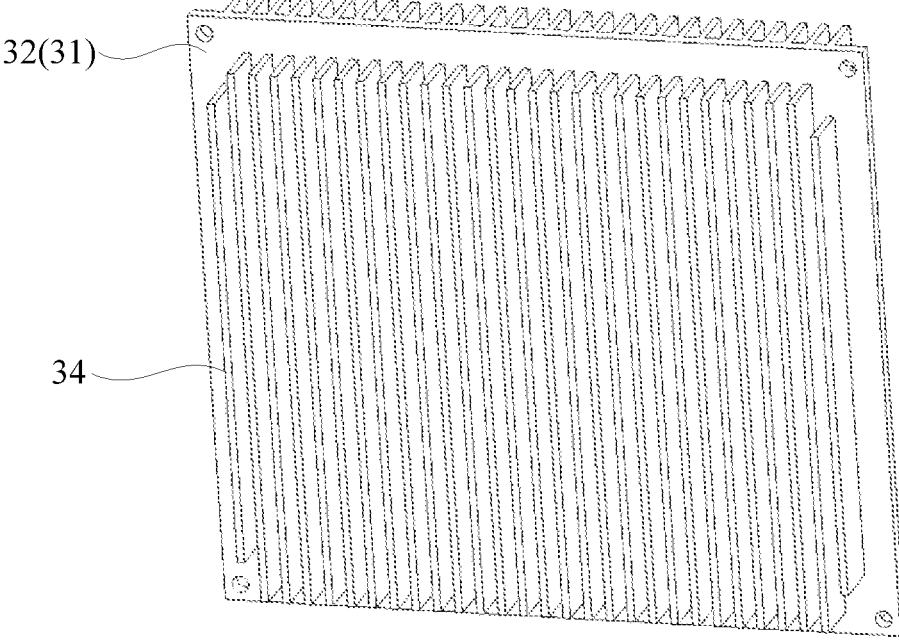
FIG. 8 is perspective view of a heat exchanger of a light engine according to another embodiment of the present disclosure.

In one embodiment, referring to FIG. 7 and FIG. 8, the first heat exchanger 31 has a needle-like or column-like heat dissipation structure made by a die-casting process. Both the first heat dissipation portion 311 and the first heat exchange portion 312 include a plurality of needle-shaped or cylindrical heat dissipation structures 33. Alternatively, the first heat exchanger 31 includes a plurality of heat dissipation fins 34 made by an extrusion process. Specially, both the first heat dissipation portion 311 and the first heat exchange portion 312 include a plurality of heat dissipation fins 34 spaced apart. The plurality of heat dissipation fins 34 of the first heat exchanging part 312 extend from an end of the fourth air channel 1112 adjacent to the air-cooling chamber 113 to an end of the fourth air channel 1112 away from the air-cooling chamber 113, and an air flow channel is formed between adjacent two cooling fins 34. The plurality of heat dissipation fins 34 of the first heat dissipation portion 311 are arranged outside the first heat exchange chamber 111 in the same arrangement as the heat dissipation fins 34 of the first heat exchange portion 312.

Furthermore, an end of the first heat exchange portion 312 away from the air-cooling chamber 113 extends through the first gap 1113 and extends into the third air channel 1111. A height of the first gap 1113 is less than half of a height of the first heat exchange chamber 111. In other embodiments, the height of the first gap 1113 may be less than ⅓ or ¼ of the height of the first heat exchange chamber 111. In this way, the cooling airflow has a long path through the first heat exchanger 31, so as to improve heat dissipation efficiency.

In an embodiment, referring to FIG. 1 and FIG. 4, the light engine further includes a second separating member 60. One end of the second separating member 60 is sealingly connected to a side of the liquid crystal light valve 24 adjacent to the second heat exchange chamber 112, and the other end of the second separating member 60 extends into the second heat exchange chamber 112. A second gap 1123 is formed between the other end of the second separating member 60 and a wall of the second heat exchange chamber 112 away from the liquid crystal light valve 24, such that the second heat exchange chamber 112 is divided into a fifth air channel 1121 away from the light converging member 22 and a sixth air channel 1122 adjacent to the light converging member 22. The air outlet of the air blower 40 is provided at an end thereof adjacent to the air-cooling chamber 113, and two sides of the end of the air blower 40 provided with the air outlet abut against the second separating member 60 and the housing 10, respectively. The air outlet of the air blower 40 is in communication with the first air channel 1131 through the sixth air channel 1122. The air inlet of the air blower 40 is provided on a side thereof away from and/or adjacent to the light converging member 22, and the air inlet of the air blower 40 is in communication with the second air channel 1132 through the second gap 1123 and the fifth air channel 1121. During the projecting process, when the light that does not pass through the liquid crystal light valve 24 is converted into heat, the air blower 40 works to enable the cooling airflow in the first closed chamber 11 to flow through the first air channel 1131 to dissipate the heat from the side of the liquid crystal light valve 24 facing the first lens 23, and then the cooling airflow flows through the first heat exchange chamber 111 into the second air channel 1132. The cooling airflow in the second air channel 1132 dissipates the heat from the side of the liquid crystal light valve 24 facing the second lens 25, and then the cooling airflow flows into the air inlet of the air blower 40 through the fifth air channel 1121 and the second space 1123. In this way, by providing the second separating member 60, an outlet airflow and an inlet airflow of the air blower 40 can be separated.

Further, referring to FIG. 1, the heat exchange device 30 further includes a second heat exchanger 32. The second heat exchanger 32 includes a second heat dissipation portion

321 and a second heat exchange portion 322. The second heat exchange portion 322 is provided in the second heat exchange chamber 112, and the second heat dissipation portion 321 is provided outside the second heat exchange chamber 112. During the projecting process, when the light that does not pass through the liquid crystal light valve 24 is converted into heat, the air blower 40 works to enable the cooling airflow in the first closed chamber 11 to flow through the first air channel 1131 to dissipate the heat from the side of the liquid crystal light valve 24 facing the first lens 23, and then the cooling airflow flows through the first heat exchange chamber 111 into the second air channel 1132. The cooling airflow flowing through the second air channel 1132 dissipates the heat from the side of the liquid crystal light valve 24 facing the second lens 25, and then the cooling airflow flows into the second heat exchange chamber 112. The second heat exchange portion 322 absorbs the heat of the cooling airflow and transfers the heat to the second heat dissipation portion 321 for cooling, and then the cooling airflow after heat exchange flows into the air inlet of the air blower 40.

Further, referring to FIG. 1, the second heat exchange portion 322 is arranged in the fifth air channel 1121, and the second heat exchange portion 322 extends from an end of the fifth air channel 1121 adjacent to the air-cooling chamber 113 to an end of the fifth air channel 1121 away from the air-cooling chamber 113. In this way, a space of the fifth air channel 1121 is fully utilized, an area of the second heat exchange portion 322 is increased, and the heat exchange efficiency of the second heat exchanger 32 is improved.

In one embodiment, referring to FIG. 7 and FIG. 8, the second heat exchanger 32 has a needle-like or column-like heat dissipation structure made by a die-casting process. Both the second heat dissipation portion 321 and the second heat exchange portion 322 include a plurality of needle-shaped or cylindrical heat dissipation structures 33. Alternatively, the second heat exchanger 32 includes a plurality of heat dissipation fins 34 made by an extrusion process. Specially, both the second heat dissipation portion 321 and the second heat exchange portion 322 include a plurality of heat dissipation fins 34 spaced apart from each other. The plurality of heat dissipation fins 34 of the second heat exchange portion 322 extend from an end of the fifth air channel 1121 adjacent to the air-cooling chamber 113 to an end of the fifth air channel 1121 away from the air-cooling chamber 113, and an air flow channel is formed between adjacent two cooling fins 34. The plurality of heat dissipation fins 34 of the first heat dissipation portion 311 are arranged outside the second heat exchange chamber 112 in the same arrangement as the heat dissipation fins 34 of the second heat exchange portion 322.

Figure 6:
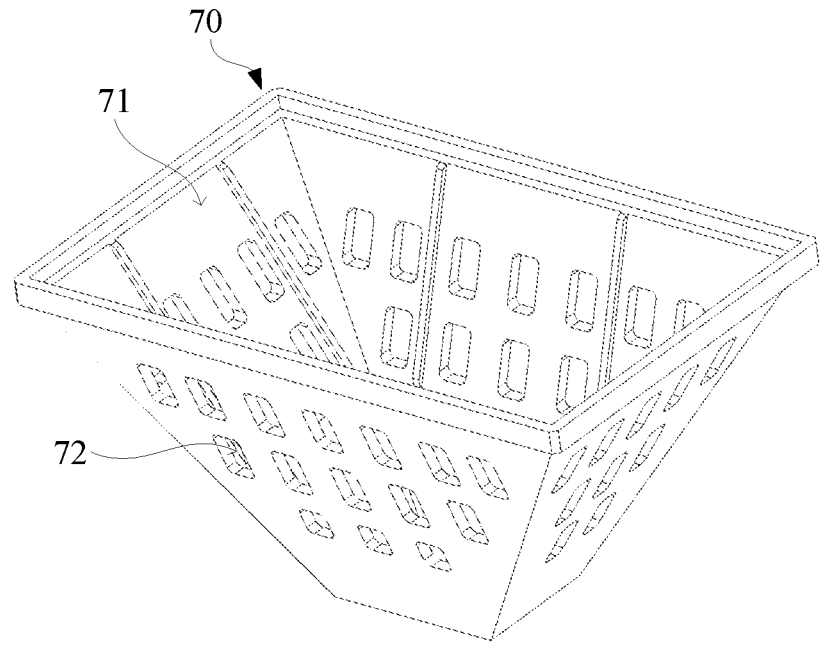
FIG. 6 is a perspective view of a bracket of a light engine according to an embodiment of the present disclosure.

In an embodiment, the light converging member 22 is shaped as a cone. The light converging member 22 has a light input end and a light output end. An area of a cross-sectional of the light converging member 22 gradually increases along a direction from the light input end to the light output end. The light source 21 is located at the light input end, and the first lens 23 is located at the light output end. Specifically, referring to FIG. 1 and FIG. 6, the light engine further includes a bracket 70 connected to the housing 10. The light input end of the light converging member 22 is located at a light inlet of the bracket 70, and the light output end of the light converging member 22 is located at the light outlet of the bracket 70. In this way, the light converging member 22 can converge light to improve the efficiency of the optical assembly 20, light loss can be reduced, brightness is increased, and costs is also reduced.

Further, the bracket 70 is provided with a receiving cavity 71 adapted to the light converging member 22, and the light converging member 22 is provided in the receiving cavity 71. A side wall of the bracket 70 is provided with a plurality of heat dissipating holes 72 in communication with the receiving cavity 71. In this way, by providing the bracket 70, the light converging member 22 can be easily mounted. In addition, since a large amount of light will be converted into heat on the light converging member 22, the temperature of the light converging member 22 increases. The heat dissipating holes 72 are provided on the side wall of the bracket 70, so that the cooling airflow outside the housing 10 can cool the light converging member 22 through the heat dissipating holes 72. The optical device is prevented from being damaged by the temperature of the light converging member 22 being too high, and the heat inside the light engine can be dissipated through the heat dissipating holes 72. It should be noted that the number and shape of the heat dissipating holes 72 may be provided as needed, and are not limited herein.

Specifically, referring to FIG. 1, the first heat exchange chamber 111, the air-cooling chamber 113, and the second heat exchange chamber 112 cooperatively define a mounting groove 13. The bracket 70 and the light converging member 22 are both arranged in the mounting groove 13. A bottom of the mounting groove 13 is provided with a light hole, and the first lens 23 is arranged in the light hole. The mounting groove 13 extends through the housing 10 along a first direction, and the first heat exchange chamber 111 and the second heat exchange chamber 112 are located on both sides of the bracket 70 in the second direction. The first direction is perpendicular to the second direction. In this way, the bracket 70 and the light converging member 22 are both arranged in the mounting groove 13, so that the cooling airflow outside of the housing 10 can enter the mounting groove 13 through an opening of the mounting groove 13, and then enter the receiving cavity 71 of the bracket 70 through the heat dissipating holes 72. The cooling airflow after heat exchange may be discharged through the heat dissipating hole 72 and the opening of the mounting groove 13, so as to cool the light converging member 22, improve the heat dissipation efficiency of the light converging member 22, and avoid the damage to the optical device caused by the high temperature of the light converging member 22.

In an embodiment, referring to FIG. 1, the second lens 25 and the housing 10 further define a second closed chamber 12, and the second closed chamber 12 is located on a side of the air-cooling chamber 113 away from the light converging member 22. The optical assembly 20 further includes a projection lens 28 and a reflector 27. The reflector 27 and at least part of the projection lens 28 are provided in the second closed chamber 12. The reflector 27 is configured to reflect the light emitted from the second lens 25 to the projection lens 28. In this way, the housing 10 is divided into the first closed chamber 11 and the second closed chamber 12 by the second lens 25. The liquid crystal light valve 24, the air blower 40, etc. are arranged in the first closed chamber 11, and the reflector 27 and the projection lens 28 are arranged in the second closed chamber 12, which can prevent the heat generated by the liquid crystal light valve 24 in the first closed chamber 11 from entering the second closed chamber 12 and affecting the projection lens 28. In addition, by arranging the reflector 27 in the second closed chamber 12, the reflector 27 can reflect light to form a folded optical path, so as to reduce a size of the housing 10, and the light engine can be miniaturized. In other embodiments, the reflector 27 may not be provided in the second closed chamber 12, and the light emitted from the light source 21 is converged by the light converging member 22, and passes through the first lens 23, the liquid crystal light valve 24 and the second lens 25 in sequence and project directly on the projection lens 28, so that the optical path is in a straight line.

Further, the second closed chamber 12 is located below the projection lens 28, and the air blower 40 is located in the second closed chamber 12. In this way, the space can be fully utilized, which is beneficial to reducing the volume of the light engine.

A projection device is further provided according to an embodiment of the present disclosure, which includes the light engine of any one of the above embodiments. The beneficial effect of the projection device is similar to that of the light engine, and will not be repeated herein.

Although the respective embodiments have been described one by one, it shall be appreciated that the respective embodiments will not be isolated. Those skilled in the art can apparently appreciate upon reading the disclosure of this application that the respective technical features involved in the respective embodiments can be combined arbitrarily between the respective embodiments as long as they have no collision with each other. Of course, the respective technical features mentioned in the same embodiment can also be combined arbitrarily as long as they have no collision with each other.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure. Therefore, the protection scope of the present disclosure shall be subject to the protection scope of the appended claims.

What is claimed is:

1. A light engine, comprising:
a housing;
an optical assembly comprising a light source and a light converging member, a first lens, a liquid crystal light valve, and a second lens arranged in sequence along a propagation path of light emitted from the light source, wherein the first lens, the second lens, and the housing cooperatively define a first closed chamber, the first closed chamber comprises an air-cooling chamber, a first heat exchange chamber, and a second heat exchange chamber, the first heat exchange chamber and the second heat exchange chamber are arranged on opposite sides of the light converging member, respectively, the air-cooling chamber is arranged between the first heat exchange chamber and the second heat exchange chamber and is in communication with the first heat exchange chamber and the second heat exchange chamber, respectively, the liquid crystal light valve is arranged in the air-cooling chamber;
a heat exchange device provided on a wall of the first heat exchange chamber and/or a wall of the second heat exchange chamber, and a part of the heat exchange device being located in the first heat exchange chamber and/or the second heat exchange chamber; and
an air blower provided in the first heat exchange chamber or the second heat exchange chamber, wherein the air blower is configured to circulate cooling airflow in the first heat exchange chamber, the air-cooling chamber, and the second heat exchange chamber and enable the cooling airflow to flow through the liquid crystal light valve and the heat exchange device, wherein a first air channel is formed between the first lens and the liquid crystal light valve, a second air channel is formed between the liquid crystal light valve and the second lens, one end of the first air channel is in communication with one end of the second air channel through the first heat exchange chamber, the other end of the second air channel is in communication with the other end of the first air channel through the second heat exchange chamber, the air blower is located in the second heat exchange chamber, the air blower is provided with an air inlet and an air outlet, the air outlet is in communication with the first air channel, and the air inlet is in communication with the second air channel.

2. The light engine according to claim 1, wherein the heat exchange device comprises a first heat exchanger comprising:
a first heat exchange portion provided in the first heat exchange chamber; and
a first heat dissipation portion provided outside the first heat exchange chamber.

3. The light engine according to claim 2, further comprising:
a first separating member, wherein one end of the first separating member is sealingly connected to a side of the liquid crystal light valve adjacent to the first heat exchange chamber, the other end of the first separating member extends into the first heat exchange chamber, a first gap is formed between the other end of the first separating member and a wall of the first heat exchange chamber away from the liquid crystal light valve, the first heat exchange chamber comprises a third air channel adjacent to the light converging member and a fourth air channel away from the light converging member, one end of the third air channel is in communication with one end of the fourth air channel through the first gap, the other end of the third air channel is in communication with the first air channel, and the other end of the fourth air channel is in communication with the second air channel.

4. The light engine according to claim 3, wherein the first heat exchange portion is arranged in the fourth air channel, and the first heat exchange portion extends from an end of the fourth air channel adjacent to the air-cooling chamber to an end of the fourth air channel away from the air-cooling chamber.

5. The light engine according to claim 4, wherein an end of the first heat exchange portion away from the air-cooling chamber extends through the first gap and extends into the third air channel.

6. The light engine according to claim 3, wherein a height of the first gap is less than half of a height of the first heat exchange chamber.

7. The light engine according to claim 1, further comprising:
a second separating member, wherein one end of the second separating member is sealingly connected to a side of the liquid crystal light valve adjacent to the second heat exchange chamber, the other end of the second separating member extends into the second heat exchange chamber, a second gap is formed between the other end of the second separating member and a wall of the second heat exchange chamber away from the liquid crystal light valve, so as to divide the second heat exchange chamber into a fifth air channel away from the light converging member and a sixth air channel adjacent to the light converging member, the air outlet of the air blower is provided at an end thereof adjacent to the air-cooling chamber, two sides of the end of the air blower provided with the air outlet abut against the second separating member and the housing, respectively, the air outlet of the air blower is in communication with the first air channel through the sixth air channel, the air inlet is provided on a side of the air blower away from and/or adjacent to the light converging member, and the air inlet is in communication with the second air channel through the second gap and the fifth air channel.

8. The light engine according to claim 7, wherein the heat exchange device further comprises a second heat exchanger comprising:

a second heat exchange portion provided in the second heat exchange chamber; and a second heat dissipation portion provided outside the second heat exchange chamber.

9. The light engine according to claim 8, wherein the second heat exchange portion is arranged in the fifth air channel, and the second heat exchange portion extends from an end of the fifth air channel adjacent to the air-cooling chamber to an end of the fifth air channel away from the air-cooling chamber.

10. The light engine according to claim 1, wherein the optical assembly further comprises a heat insulating optical plate provided in the air-cooling chamber.

11. The light engine according to claim 10, wherein the heat insulating optical plate is arranged between the first lens and the liquid crystal light valve, and the heat insulating optical plate is sealingly connected to the first lens.

12. The light engine according to claim 11, wherein the first air channel is formed between the heat insulating optical plate and the liquid crystal light valve.

13. The light engine according to claim 11, wherein the heat insulating optical plate divides the first air channel into a first air sub-channel between the first lens and the heat insulating optical plate and a second air sub-channel between the heat insulating optical plate and the liquid crystal light valve.

14. The light engine according to claim 10, wherein the heat insulating optical plate is arranged at a side of the first lens away from the liquid crystal light valve, and the heat insulating optical plate is sealingly connected to the first lens.

15. The light engine according to claim 1, wherein the light converging member has a light input end and a light output end, an area of a cross-sectional of the light converging member gradually increases along a direction from the light input end to the light output end, the light source is located at the light input end, and the first lens is located at the light output end.

16. The light engine according to claim 1, further comprises:

a bracket connected to the housing, wherein the bracket is provided with a receiving cavity, the light converging member is provided in the receiving cavity, a side wall of the bracket is provided with a plurality of heat dissipating holes in communication with the receiving cavity.

17. The light engine according to claim 1, wherein the second lens and the housing cooperatively define a second closed chamber, the second closed chamber is located on a side of the air-cooling chamber away from the light converging member, the optical assembly further comprises a projection lens and a reflector, the reflector and at least part of the projection lens are provided in the second closed chamber, and the reflector is configured to reflect the light emitted from the second lens to the projection lens.

18. A projection device, comprising:

a light engine, comprising:

a housing;

an optical assembly comprising a light source and a light converging member, a first lens, a liquid crystal light valve, and a second lens arranged in sequence along a propagation path of light emitted from the light source, wherein the first lens, the second lens, and the housing cooperatively define a first closed chamber, the first closed chamber comprises an air-cooling chamber, a first heat exchange chamber, and a second heat exchange chamber, the first heat exchange chamber and the second heat exchange chamber are arranged on opposite sides of the light converging member, respectively, the air-cooling chamber is arranged between the first heat exchange chamber and the second heat exchange chamber and is in communication with the first heat exchange chamber and the second heat exchange chamber, respectively, the liquid crystal light valve is arranged in the air-cooling chamber;

a heat exchange device provided on a wall of the first heat exchange chamber and/or a wall of the second heat exchange chamber, and a part of the heat exchange device being located in the first heat exchange chamber and/or the second heat exchange chamber; and an air blower provided in the first heat exchange chamber or the second heat exchange chamber, wherein the air blower is configured to circulate cooling airflow in the first heat exchange chamber, the air-cooling chamber, and the second heat exchange chamber and enable the cooling airflow to flow through the liquid crystal light valve and the heat exchange device, wherein a first air channel is formed between the first lens and the liquid crystal light valve, a second air channel is formed between the liquid crystal light valve and the second lens, one end of the first air channel is in communication with one end of the second air channel through the first heat exchange chamber, the other end of the second air channel is in communication with the other end of the first air channel through the second heat exchange chamber, the air blower is located in the second heat exchange chamber, the air blower is provided with an air inlet and an air outlet, the air outlet is in communication with the first air channel, and the air inlet is in communication with the second air channel.

* * * * *